United States Patent
Boyette et al.

(10) Patent No.: US 9,092,751 B2
(45) Date of Patent: Jul. 28, 2015

(54) PROCESS NETWORKING AND RESOURCE OPTIMIZATION

(71) Applicant: International Business Machines Corporation, Armonk, NY (US)

(72) Inventors: Neil H. A. Boyette, Oregon City, OR (US); Haijing Fang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 13/932,912

(22) Filed: Jul. 1, 2013

(65) Prior Publication Data

US 2015/0006233 A1  Jan. 1, 2015

(51) Int. Cl.
  G06Q 10/06  (2012.01)
  G06Q 10/10  (2012.01)
  G06F 9/50   (2006.01)

(52) U.S. Cl.
  CPC ........... G06Q 10/06316 (2013.01); G06F 9/50 (2013.01); G06Q 10/06 (2013.01); G06Q 10/063 (2013.01); G06Q 10/10 (2013.01); G06Q 10/101 (2013.01); G06Q 10/103 (2013.01)

(58) Field of Classification Search
  None
  See application file for complete search history.

(56) References Cited

U.S. PATENT DOCUMENTS

2005/0027577 A1* 2/2005 Saeed ............................. 705/8
2008/0004923 A1  1/2008 Hacigumus
2009/0281956 A1  11/2009 An et al.
2011/0071869 A1* 3/2011 O'Brien et al. .................. 705/7

FOREIGN PATENT DOCUMENTS

EP  1610243 A1  12/2005

OTHER PUBLICATIONS

J Eduardo, et al.; "Project Acceleration via Activity Crashing, Overlapping, and Subsitutuion" IEEE Transactions on Engineering Management, vol. 55, No. 4, Nov. 2008; pp. 590-601.
S. J. Mason; "Optimation of Multi-Project Environment (Opmpe)"; 2008; pp. 2421-2430.
Palem, KV.; "Efficient Algorithm for Scheduling Precedence-Constrained Tasks on Pipelines"; Feb. 15, 2005; pp. 8.
Lloyd, EL. et al.; "Critical Path Scheduling of Task Systems With Resource and Processor Constraints"; Apr. 12, 2007; pp. 69.
An Ngo-The, et al: "Optimized Resource Allocation for Software Release Planning"; IEEE Transactions on Software Engineering, vol. 35, No. 1, Jan./Feb. 2009; pp. 109-123.
N. Boyette, et al.; "Budget Allocation Optimization in a Complex MultiProject Environment": 2012; pp. 456-461.

* cited by examiner

*Primary Examiner* — Qing Wu
(74) *Attorney, Agent, or Firm* — Cantor Colburn LLP (57) ABSTRACT

A method includes obtaining, by a processor, a representation of a first process and dividing the first process into tasks that make up the first process. The method includes determining relationships between the tasks and generating a task network comprising the tasks of the first process. The task network represents the relationships between the tasks of the first process. The method further includes receiving a priority criterion defining an objective and generating, based on the priority criterion, an optimal set of tasks in the task network to be performed.

15 Claims, 5 Drawing Sheets

PROCESS NETWORKING AND RESOURCE OPTIMIZATION

BACKGROUND

The present disclosure relates to process optimization and, in particular, to optimizing the execution of processes.

Decision makers in organizations often face the challenge of determining which projects, among a large number of possible projects, should receive resource allocations to obtain the best value for the organization, as well as the challenge of determining how and when each part of the process (as a generalization of the project concept) should be executed to completion. Organizations may have limited budgets of resources, including people, money, time and other resources, and decision makers need to determine how to achieve priorities of the organization in executing projects with the limited resources.

SUMMARY

Embodiments include a method including obtaining, by a processor, a representation of a first process and dividing the first process into tasks that make up the first process. The method includes determining, by the processor, relationships between the tasks. The method further includes generating, by the processor, a task network comprising the tasks of the first process, the task network representing the relationships between the tasks of the first process. The method further includes receiving, by the processor, a priority criterion defining an objective and generating, based on the priority criterion, an optimal set of tasks in the task network to be performed.

Further embodiments include a computer program product including memory configured to store computer instructions, and a processor configured to execute the computer instructions to perform a method. The method includes obtaining a representation of a first process and a second process and dividing the first process and the second process into tasks that make up the first process and the second process. The method includes determining relationships between the tasks and generating a task network including the tasks of the first and second processes. The task network represents the relationships between the tasks of the first and second processes. The method includes receiving a priority criterion defining an objective and generating, based on the priority criterion, an optimal set of tasks in the task network to be performed.

Further embodiments include a method for planning in a context of proposed and ongoing projects. The method includes dividing each of the proposed and ongoing projects into tasks and identifying, by a project optimization computer, tasks that are at least one of: similar to each other, identical to each other, and have one or more dependent relationships among the tasks. The method includes representing, by a display device controlled by the project optimization computer, the proposed and ongoing projects collectively as a graphical network of the tasks, such that common tasks among the proposed and ongoing projects are represented as sharing nodes in the graphical network of tasks. The method further includes receiving, by the project optimization computer, from a user, one or more goals corresponding to objectives, and selecting, by the project optimization computer, an optimal path in the graphical network corresponding to at least one of the specified goals.

Additional features and advantages are realized through the techniques of the present disclosure. Other embodiments and aspects of the present disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter of the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Users, organizations and systems execute multiple processes made up of various tasks. When determining how to allocate resources in a predetermined time period, different users, organizations or systems may have different priorities than merely performing one process from start to finish. Embodiments of the invention relate to analyzing tasks of multiple processes and generating an optimal resource allocation plan based on optimization criteria provided by a user, organization or system.

Figure 1:
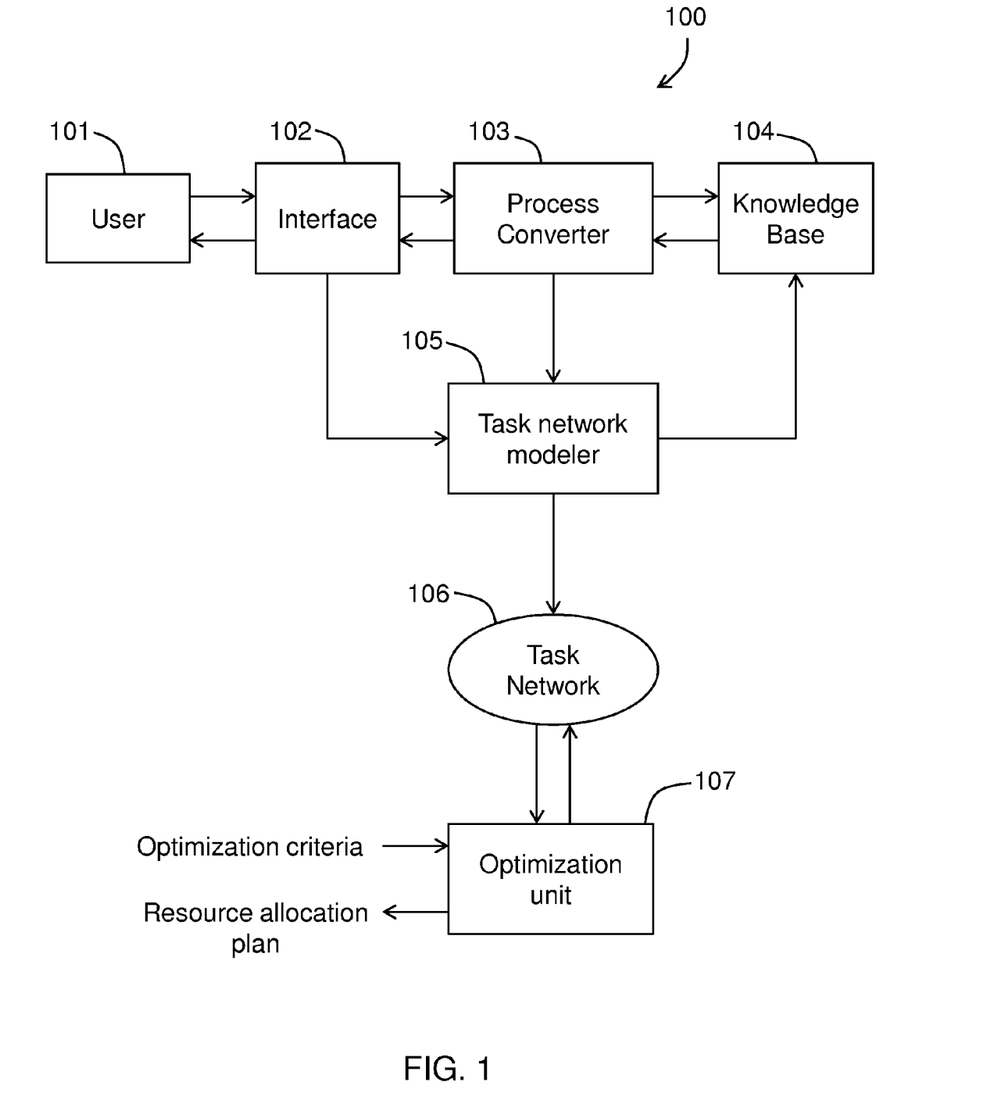
FIG. 1 illustrates a system for generating a resource allocation plan according to one embodiment of the present invention.

FIG. 1 illustrates a system 100 for generating a resource allocation plan according to one embodiment of the invention.

The system 100 receives a process as an input from one or more users 101, analyzes the received process to generate a task network and generates data to optimize execution of tasks. The system 100 includes an interface 102 to receive the input from the user 101. The interface 102 may include any type of user interface, including software and hardware to provide a user with sensory representations of user inputs and to convert user inputs into data that may be analyzed by a processor executing a program for analyzing the processes. In one embodiment, the received process is a project, or a process that is designed to accomplish a particular objective or result. However, embodiments of the invention encompass any type of process.

The process converter 103 receives the one or more processes from the interface 102 and breaks down the processes into tasks. In the present specification and claims, tasks are incremental actions that together form a path to complete a process. The processes may be received in any format, including a text format input by a user, a graphical format input by a user, an electronic format based on text conversion, text analysis, image analysis or any other digital process for converting data from a document into organized and categorized data in an electronic storage medium.

In one embodiment, the system 100 includes a knowledge base 104 which stores previously-entered, received or deduced processes and tasks. The process converter 103 may access the knowledge base 104 to break up the processes into tasks. The knowledge base 104 may include information regarding how processes may be broken up into tasks, and other information regarding the tasks, such as an estimated time to complete the task, estimated resources to complete the task, inputs and outputs of the task, etc.

In one embodiment, after the process converter 103 generates a set of tasks that make up the received process, the set of tasks is provided to the user 101 via the interface 102 to validate that the tasks provided by the process converter 103 are the correct tasks for performing the process entered by the user 101. The user 101 may view, accept, revise or reject the tasks provided by the process converter 103. Characteristics of the tasks may be provided from the knowledge base 104 or from the user 101. Characteristics of the tasks include an initial status of the task, a present status of the task, an expected result of the task, technology associated with the task, resources required to complete the task, prerequisite tasks or resources, a cost of the task or any other information.

The set of tasks and their dependencies from each other are provided to a task network modeler 105. The task network modeler 105 takes the set of tasks from the process converter 103, and optionally from the interface 102, and generates a task network 106. The task network modeler 105 analyzes the characteristics of the tasks, such as the initial status of the task, the present status of the task, the expected result of the task, the technology associated with the task, the resources required to complete the task, the prerequisite tasks or resources, the cost of the task, or any other characteristics.

The task network modeler 105 converts the tasks into nodes, where each node represents a task and the directed arc between two nodes represents the dependent relationship between the two tasks represented by the two nodes. Tasks that are the same are represented as a single node in the task network 106. Multiple arcs into, or out from, a node represent re-use of the node among multiple processes.

In one embodiment, the task network modeler 105 determines whether tasks are an identical match, a partial match or no match. When two tasks are an identical match, the same node is used to represent the two tasks. When there is no match between a task and any other task in the task network 106, a new node is generated to represent the new task. For tasks that are a partial match, so that some characteristics of the task match, but other characteristics do not match, the task network modeler 105 determines whether the task may be divided into sub-tasks. If so, the task network modeler 105 divides the task into sub-tasks. A common sub-task between two tasks is designated by the same node, and sub-tasks that are not in common between multiple tasks are represented by separate nodes. The nodes representing sub-tasks of partially-matching tasks that are not common to each of the tasks may be referred to as adapter nodes. On the other hand, if there is a partial match between two tasks, but the network modeler 105 determines that the tasks cannot be divided into sub-tasks, then a new node is created in the task network 106.

For example, if project X has a task (task A) to create a blue widget and project Y has a task (task B) to create a red widget, task A and task B may be partially-matching tasks. The task network modeler 105 splits task A into task C ("create a widget") and adapter task D ("paint the widget blue"). Likewise, task B is replaced by task C and an adapter task E ("paint the widget red"). Accordingly, portions of tasks that partially-match other tasks may be reused by other tasks in the task network 106.

In an embodiment in which there are multiple ways to implement a task, the multiple approaches are all represented in the task network 106 to both permit the re-use of the tasks when other processes are added, as well as to show the different paths to complete the project.

The route through the task network 106 from a project's start to the project's completion represents a specific way to complete the process. For any given project, multiple paths may be possible, and each path may have different characteristics, such as costs, resource requirements, risks, etc.

Figure 2:
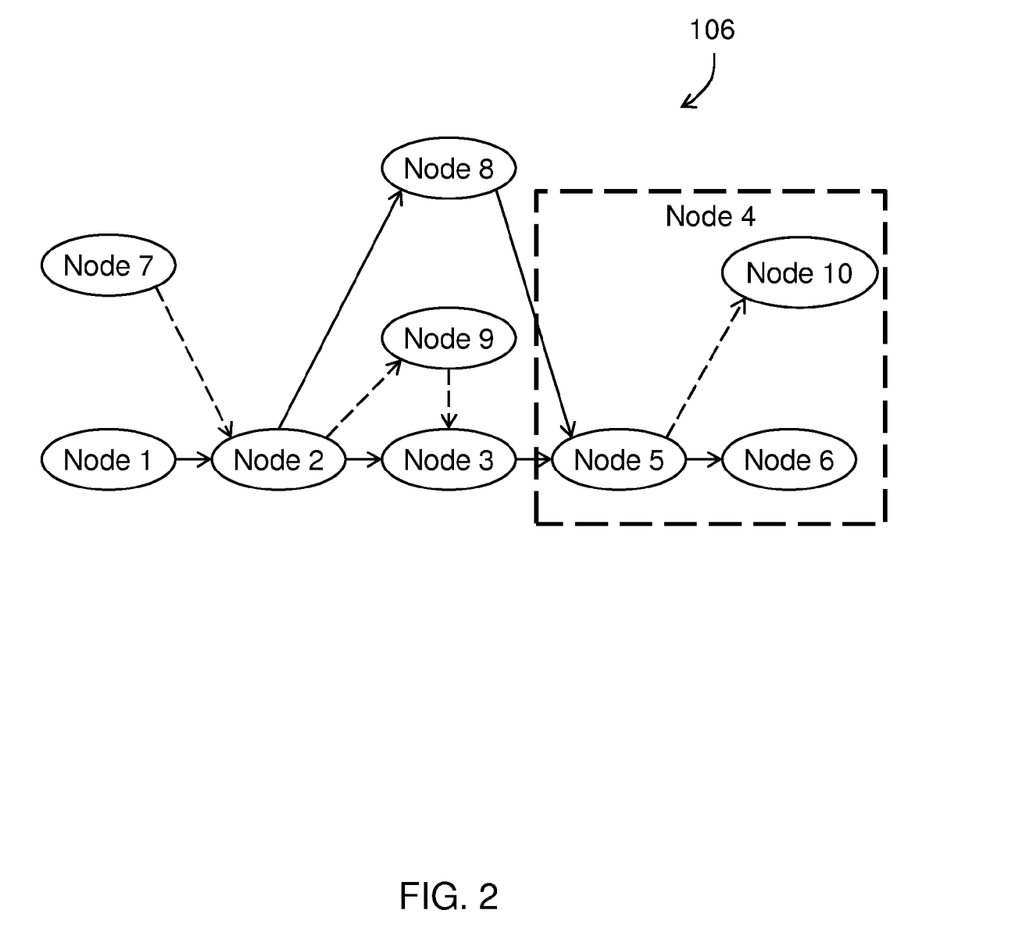
FIG. 2 illustrates an example of a task network according to an embodiment of the invention.

FIG. 2 illustrates an example of a task network 106 according to an embodiment of the invention. The task network 106 includes two processes. The first process, indicated by solid arrows, includes nodes 1, 2, 3, 5, 6 and 8. The second process, indicated by dashed arrows, includes nodes 7, 2, 9, 3, 5 and 10. During analysis of the tasks to generate the task network 106, the network modeler 105 identifies that a task of the first process is the same as a task of the second process, and thus node 2 is generated to represent a task that is identical and shared between the first process and the second process. In contrast, nodes 7, 9 and 10 are exclusive to the second process and nodes 1, 6 and 8 are exclusive to the first process. In other words, nodes 7, 9 and 10 are located in the second process and not in the first process, and nodes 1, 6 and 8 are located in the first process and not in the second process.

In one embodiment, a task represented by node 4 is identified as a partial match between the first process and the second process. Accordingly, node 4 is divided into sub-tasks. Specifically, node 4 is divided into a shared node, node 5, representing portions of the node that are shared between the first and second processes, and adapter nodes, node 10 and node 6, corresponding to portions of node 4 that are exclusive to the second process and the first process, respectively.

Referring to the first process, node 8 may be one alternative task for bridging nodes 2 and 5, and node 3 may be another alternative task for bridging nodes 2 and 5. Nodes 3 and 8 may use different resources or have other differing characteristics. In embodiments of the invention, both of the alternative paths (node 2 to node 3 to node 5; and node 2 to node 8 to node 5) are provided in the task network 106 provided to the optimization unit 107.

While FIG. 2 is provided by way of example, embodiments of the invention encompass any task network made up of any number of processes, any number of tasks and any configuration of related tasks.

The optimization unit 107 receives as inputs a task network 106 and optimization criteria. The optimization criteria may be provided by the user 101 who provides the processes to the process converter 103, by another user or by a system or by any other source. The optimization criteria define goals or objectives to be met by the resource allocation plan, or a budget plan. The resource allocation plan or budget plan defines tasks and processes to be carried out, or how resources are to be allocated to carry out tasks or processes.

For example, a first organization may have a set monetary budget and a priority of employing the greatest number of people in the organization during a predetermined period of time. The monetary budget and optimization criterion of employing the greatest number of people in the organization are provided to the optimization unit, which generates a resource allocation plan. The resource allocation plan describes the optimal set of tasks in the task network 106 that are to be completed to meet the organization's goal of employing the greatest number of people during the predetermined period of time. In one embodiment, resources may be available to the organization to complete any five tasks of the task network 106. Accordingly, it would be possible to complete tasks 1, 2, 3, 5 and 6 to complete the first process. However, based on the optimization criterion, the optimization unit may determine that the organization's goals are better met by completing tasks 1, 2, 3, 7 and 9. In other words, based on the goals or objectives of the organization, it may be preferable not to complete a process in a particular budget cycle, but rather to have multiple processes in-progress. The optimization unit 107 is able to analyze each task of the task network 106, and determine, based on the optimization criteria provided by a user, organization or system, which tasks best meet the organization's goals or objectives.

The organization may alternatively (or additionally) have an objective or goal of performing tasks that are visible or apparent to a predetermined audience. For example, a police department may place a priority on having police officers visible in the community, so tasks which are visible to the community may be more important to the police department than other types of tasks. Accordingly, a visibility characteristic may be identified for each task by the process converter 103, or may be provided by the user 101 or the knowledge base 104. The visibility level of each task is provided to the optimization unit 107 as an optimization criterion, and the optimization unit 107 generates a resource allocation plan describing the tasks in the task network 106 to be completed within the predetermined period of time and in the set monetary budget that would provide the greatest level of visibility to the predetermined audience.

In yet an alternative embodiment, the optimization criterion is completing the greatest number of tasks within the set monetary budget in the predetermined period of time. Accordingly, the optimization unit 107 generates a resource allocation plan that describes the optimal set of tasks to be completed in the task network 106 to complete the maximum number of tasks in the predetermined period of time. Other optimization criteria include completing the maximum number of shared tasks, completing tasks from the maximum number of separate processes in the task network 106, using a certain amount of a predetermined resource, such as money, people, computer bandwidth, physical materials, physical facilities, hardware, vehicles, or any other resource. In other words, embodiments of the invention encompass the generation of budget plans or resource allocation plans describing optimal sets of tasks to perform in a task network based on received optimization criteria and characteristics of tasks in the task network 106.

In one embodiment, the user 101 or another system provides a starting location, a current status of the nodes in the task network 106, a destination location representing an end of one or more processes, a desired status of one or more nodes in the task network 106 and any other information regarding the task network 106 and optimization criteria to generate the budget plan or resource allocation plan.

In one embodiment, the optimization unit 107 scores each path, from a starting point or current status to a destination location or final state of the tasks, based on the optimization criteria provided by the user or another system. The path through the task network 106 that has the best score is returned to the user as the resource allocation plan or budget plan and describes the set of tasks to which resources should be allocated to achieve the objectives provided by the user. Alternatively, multiple paths may be provided to the user along with the respective scores to permit the user to compare multiple paths and scores.

Embodiments of the invention may be used to provide guidance to a user or organization regarding which tasks should be performed, or to which tasks resources should be provided, during a given budget cycle. According to embodiments of the invention, a process of the task network 106 may not be completed during one budget cycle. For example, based on the optimization criteria provided by a user, organization or system, tasks may be completed within multiple processes without completing any of the processes within the given budget cycle. At the beginning of a new budget cycle, the optimization criteria may be either left the same or changed, new processes may be added to the task network, old tasks or processes may be omitted, and tasks may be updated within the task network. At the beginning of each new budget cycle, the status of tasks in the task network 106 may be updated to reflect progress on the task from the previous budget cycle. Accordingly, a user, organization or system may select multiple tasks from multiple different processes for completion during each budget cycle according to optimization criteria provided by the user, organization or system, where the multiple different processes correspond to processes the user, organization or system wants to have completed. While the user, organization or system may provide "completion of a process" as an optimization criterion to perform the maximum number of tasks within one process, other optimization criteria may not correspond to completion of a process, but may instead correspond to other factors that may be more important to the organization during any given budget cycle than the completion of the process.

Figure 3:
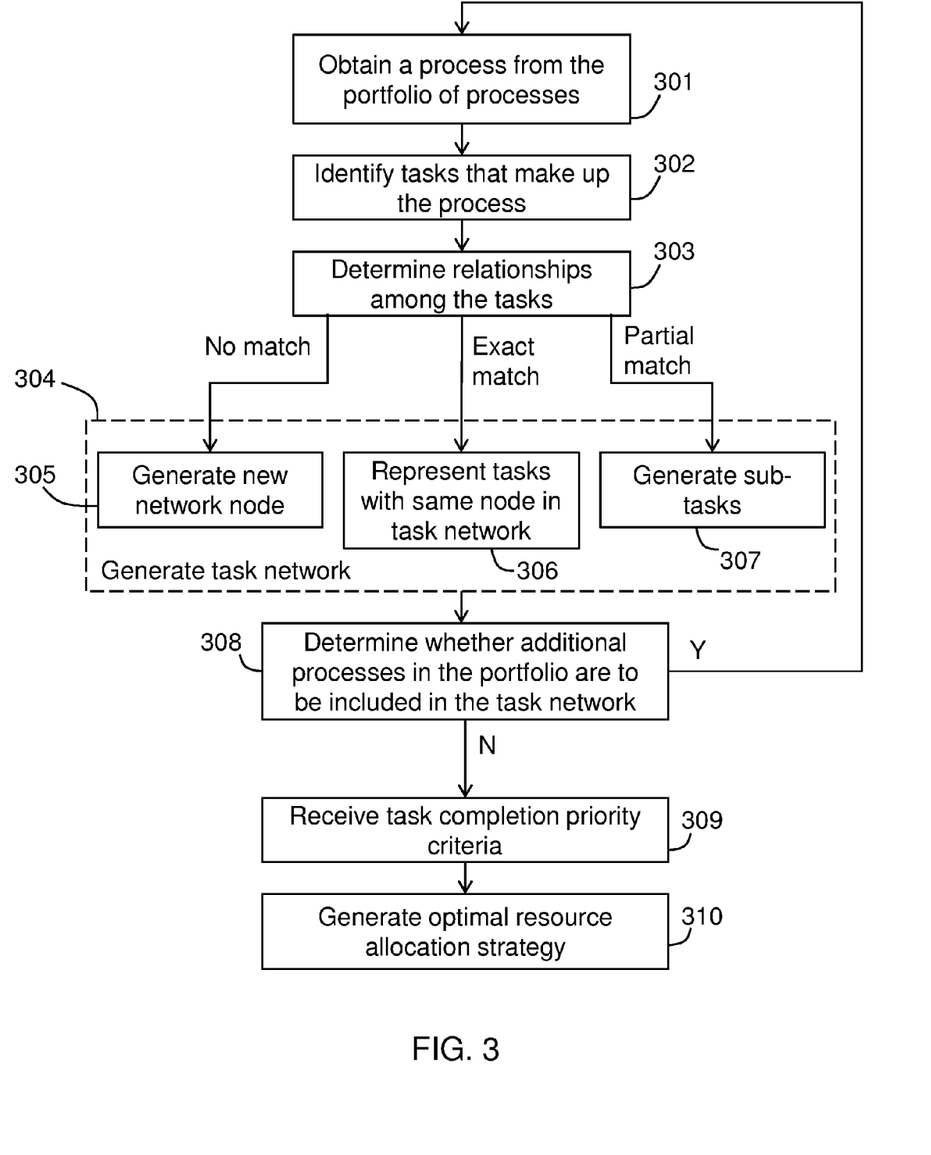
FIG. 3 illustrates a flowchart of a method for pruning a value driver tree according to an embodiment of the invention.

FIG. 3 illustrates a flowchart of a method according to an embodiment of the invention. In block 301, a portfolio of processes (containing one or more processes) is obtained by a system, and in particular a computer system capable of analyzing processes and recommending an optimal resource allocation plan based on optimization criteria provided by a user, organization or system. A method is selected for analysis from among the portfolio of processes.

In block 302, the process is broken up into tasks. The process is defined as a series of tasks executed in a particular order. In one embodiment, a person manually creates different tasks for a process and enters the different tasks into a computer system that generates an optimal resource strategy. In another embodiment, a text recognition program may be used to parse requirements documents or other documents that describe a project. In one embodiment, processes are divided into tasks by referring to a knowledge base of stored information, such as previously-executed or designed processes and tasks.

In one embodiment, identifying the tasks includes associating certain types of information with the tasks, including a goal of the task, expected inputs and outputs, technology used by the task, resources expended by the task, monetary costs, methods, time restrictions, people who would perform the task, or any other identifying information.

In block 303, relationships among the tasks are determined and a task network is generated. For example, after identifying the tasks in block 302, a large number of tasks may be identified, the tasks being associated with particular processes. The relationships among the tasks may be used by iterating over the tasks. For example, each of the tasks to be performed by a user, organization or system may be compared to each other task. The tasks are compared by comparing the information associated with the tasks, such as inputs, outputs, resources to execute the task, or any other information about the tasks. For tasks that do not match another task among all of the tasks, a new network node is generated in block 305. A non-match may be identified based on characteristics of the tasks that are determined to be vital by a user, such as inputs and outputs of the task. When the new node is added to the task network, any relationships between the node and any other nodes are also added to the task network.

If it is determined that there is an exact match between two or more tasks, then the same node in the task network is used to represent the two or more tasks (block 306). The exact match is determined based on information related to the tasks matching exactly, such as the task requiring the same inputs or resources and outputting the same outputs.

If a partial match is detected, then sub-tasks are generated in block 307. In particular, two or more tasks may be divided into (i) a common sub-task that is common to the two or more tasks and (ii) exclusive sub-tasks that are not common to the two or more tasks. In other words, the exclusive sub-tasks are found in one of the tasks and are not found in another of the tasks.

Based on the nodes generated by the various tasks, including shared tasks, partially-shared tasks, and tasks that are exclusive to a particular process, the task network is completed defining various paths to achieve different processes. In one embodiment, a single process may be represented by multiple paths.

In block 308, it is determined if additional processes in the portfolio of processes are to be analyzed. If so, then the process returns to block 301. However, it is understood that embodiments of the invention also encompass simultaneous analysis of multiple processes, such as by multiple processing cores, by interleaving software code, or by any other method.

In block 309, priority criteria related to the completion of tasks and processes are provided or received. The priority criteria describe the goals or objectives of a user, organization or system. The goals or objectives determine how the tasks should be executed in a given time period. For example, the goals or objectives may determine whether tasks are executed in order, a number of tasks to be executed in a time period, the types of tasks that are executed, etc. The priority criteria may include various objectives including staying under a given cost, maximizing a particular resource, completing a particular process or project, or any other priority criteria that are determined to be of importance to a user, organization or system.

In block 310, an optimal resource allocation strategy is generated based on the priority criteria and the task network. The optimal resource allocation strategy may be generated by computing the optimal set of paths in the task network corresponding to the priority criteria. In one embodiment, multiple paths of tasks, or multiple sets of tasks, are provided to a user, organization or system, and the multiple paths or sets of tasks may be ordered based on how well the paths or sets of tasks satisfy the priority criteria.

In one embodiment, an optimization computer system locates the starting point(s) and the destination(s) of a set of tasks and utilizes a graph traversing algorithm to generate all possible routes from the starting points to the destinations. Each path may be defined by a route from a starting point to a destination, and the route tells a user which processes are involved in completing the tasks of the route, and each route can be converted into a budget allocation plan for a particular process. The routes can then be scored according to a user's priority criteria.

Figure 4:
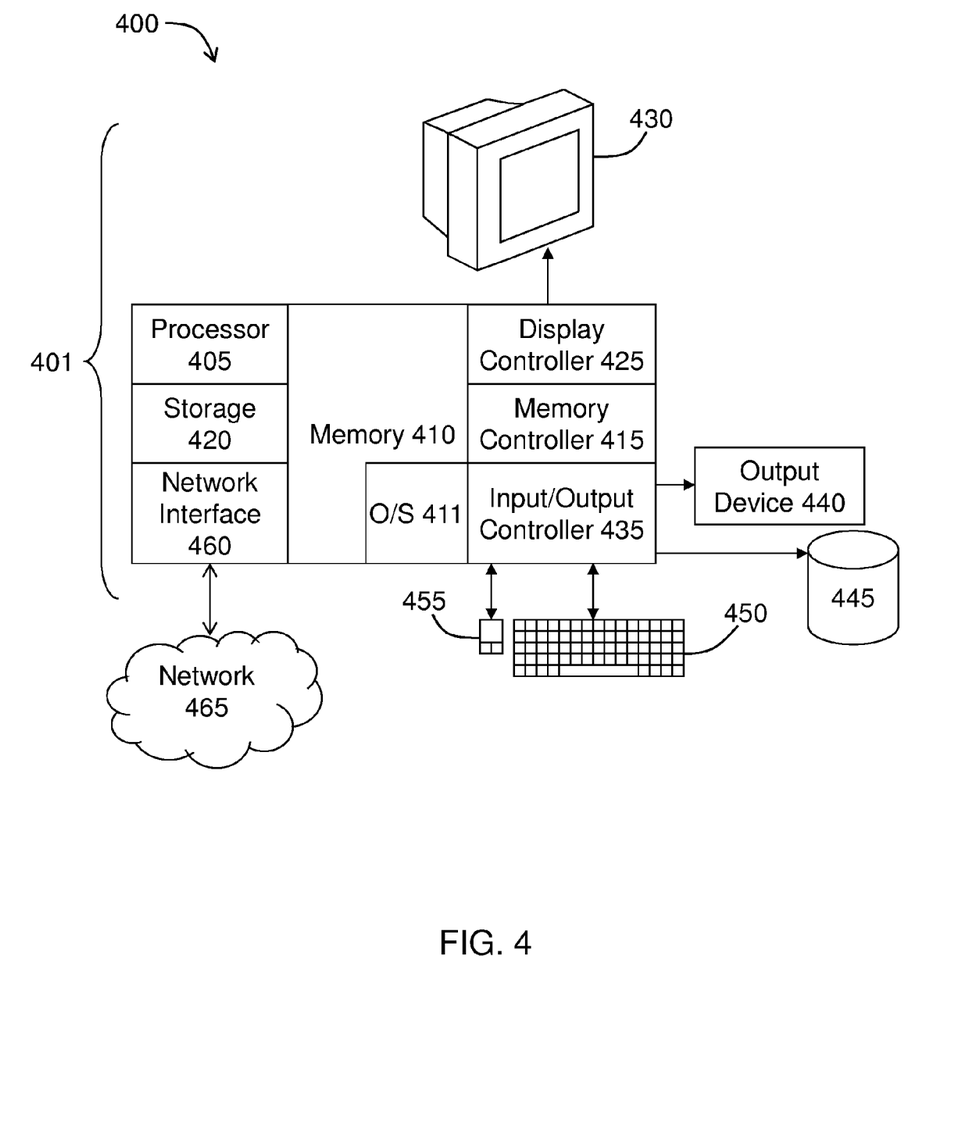
FIG. 4 illustrates a computer system according to one embodiment.

FIG. 4 illustrates a block diagram of a computer system 400 according to an embodiment of the present disclosure. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 400 therefore may include general-purpose computer or mainframe 401.

In an exemplary embodiment, in terms of hardware architecture, as shown in FIG. 4, the computer 401 includes one or more processors 405, memory 410 coupled to a memory controller 415, and one or more input and/or output (I/O) devices 440, 445 (or peripherals) that are communicatively coupled via a local input/output controller 435. The input/output controller 435 can be, for example, one or more buses or other wired or wireless connections, as is known in the art. The input/output controller 435 may have additional elements, which are omitted for simplicity in description, such as controllers, buffers (caches), drivers, repeaters, and receivers, to enable communications. Further, the local interface may include address, control, and/or data connections to enable appropriate communications among the aforementioned components. The input/output controller 435 may access the output devices 440 and 445.

The processor 405 is a hardware device for executing software, particularly that stored in storage 420, such as cache storage, or memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remotely from one another, but can be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (O/S) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example, but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be any type of network, such as an IP-based network for communication between the computer 401 and any external server, client and the like via a broadband connection, an optical fiber network, or any other type of network.

The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

When the computer 401 is in operation, the processor 405 is configured to execute instructions stored within the memory 410, to communicate data to and from the memory 410, and to generally control operations of the computer 401 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In embodiments of the present disclosure, a resource optimization plan or budget may utilize hardware and software within the computer system 400, including memory 410 or output devices 440 and 445 for storing information regarding processes and tasks that make up the processes. The processor 405 may break down processes into tasks, may perform iteration of tasks of different processes to identify matches among the tasks and to generate a task network, and may generate the optimal resource allocation plan. The display controller 425 may generate a display of different routes between a start and a destination of processes in the task network and may provide optimal resource allocation information for each route. The process converter 103, task network modeler 105 and optimization unit 107 may include the processor 405, such as the processor 405 executing instructions stored in the memory 410.

Figure 5:
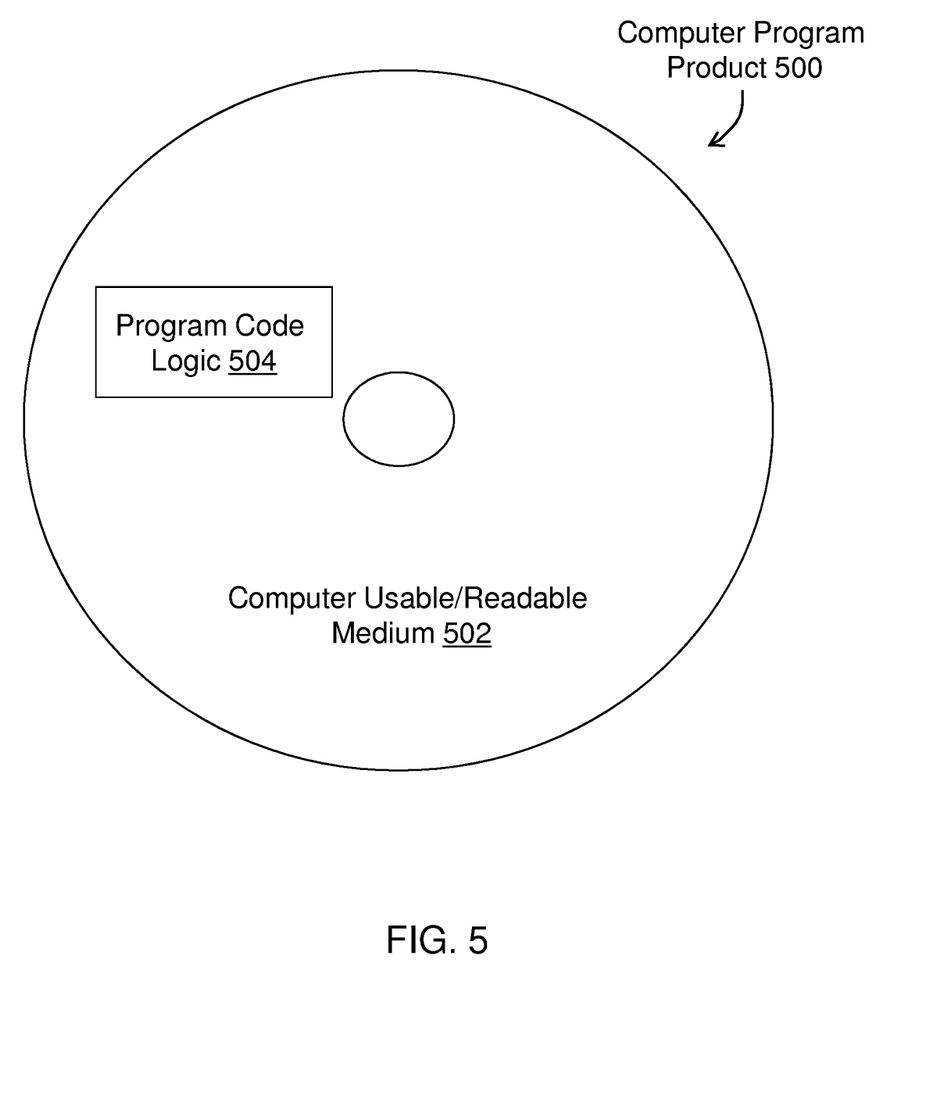
FIG. 5 illustrates a computer program product according to one embodiment of the invention.

As described above, embodiments can be embodied in the form of computer-implemented processes and apparatuses for practicing those processes. An embodiment may include a computer program product 500 as depicted in FIG. 5 on a computer readable/usable medium 502 with computer program code logic 504 containing instructions embodied in tangible media as an article of manufacture. Exemplary articles of manufacture for computer readable/usable medium 502 may include floppy diskettes, CD-ROMs, hard drives, universal serial bus (USB) flash drives, or any other computer-readable storage medium, wherein, when the computer program code logic 504 is loaded into and executed by a computer, the computer becomes an apparatus for practicing the embodiments. Embodiments include computer program code logic 504, for example, whether stored in a storage medium, loaded into and/or executed by a computer, or transmitted over some transmission medium, such as over electrical wiring or cabling, through fiber optics, or via electromagnetic radiation, wherein, when the computer program code logic 504 is loaded into and executed by a computer, the computer becomes an apparatus for practicing the embodiments. When implemented on a general-purpose microprocessor, the computer program code logic 504 segments configure the microprocessor to create specific logic circuits.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention to the particular embodiments described. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosed embodiments. Many modifications and variations will be apparent to those of ordinary skill in the art without departing from the scope and spirit of the embodiments of the present disclosure.

In embodiments of the present disclosure, effects of modifications to standard business processes may be estimated based on stored prior modifications to the standard business processes. In addition, proposed modifications to standard business processes may be provided based on desired effects provided by an entity. Accordingly, past customizations to processes may be utilized to more efficiently design and select future customizations. In addition, guidance may be provided to entities regarding the likely effects of desired changes to processes implemented by the entities. Examples of processes may include business financial or operational processes, software or electrical processes and manufacturing processes. However, it is understood that embodiments of the present disclosure encompass any process that may be represented by data in a graphical form, stored and analyzed.

Embodiments include a system including the following: a process input interface to receive processes, a process converter that converts each process received from the input interface into tasks, and a task network modeler that determines relationships between the tasks and generates a task network comprising the tasks of existing processes and inputted processes. The task network represents the relationships between the tasks of existing processes and inputted processes. The system includes an optimization unit that generates an optimal set of tasks selected from the task network based on a given priority criterion, to be performed to achieve a given objective and a user interface to receive from a user a priority criterion defining an objective and output an optimal set of tasks to be performed to achieve the objective the user defined.

Further embodiments include a computer program product including memory configured to store computer instructions, and a processor configured to execute the computer instructions to perform a method. The computer program product includes a process input interface to receive processes, a process converter that converts each process received from the input interface into tasks, and a task network modeler that determines relationships between the tasks and generates a task network comprising the tasks of existing processes and inputted processes. The task network represents the relationships between the tasks of existing processes and inputted processes. The computer program product includes an optimization unit that generates an optimal set of tasks selected from the task network based on a given priority criterion, to be performed to achieve a given objective and a user interface to receive from a user a priority criterion defining an objective and output a optimal set of tasks to be performed to achieve the objective the user defined.

While embodiments have been described above, it will be understood that those skilled in the art, both now and in the future, may make various improvements and enhancements which fall within the scope of the claims which follow.

What is claimed is:

1. A method comprising:
 obtaining, by a processor, a representation of a first process;
 dividing the first process into tasks that make up the first process;
 determining, by the processor, relationships between the tasks;
 generating, by the processor, a task network comprising the tasks of the first process, the task network representing the relationships between the tasks of the first process;
 receiving, by the processor, a priority criterion defining an objective; and
 generating, based on the priority criterion, an optimal set of tasks in the task network to be performed.

2. The method of claim 1, wherein
 generating the task network includes identifying characteristics of the tasks, and
 generating the optimal set of tasks includes determining that the optimal set of tasks includes characteristics most likely to meet the objective defined by the priority criterion.

3. The method of claim 2, wherein determining the relationships between the tasks includes determining a similarity between characteristics of the tasks, the characteristics including at least one of a resource needed to perform the task and an output of the task.

4. The method of claim 1, wherein determining the relationships between the tasks includes determining whether a first task and a second task among the tasks are identical, whether no match exists between the first task and the second task, and whether the first task partially matches the second task.

5. The method of claim 4, further comprising:
determining that the first task partially matches the second task; and
generating a first sub-task and a second sub-task based on determining that the first task partially matches the second sub-task, the first sub-task being in common with the first task and the second task, and the second sub-task being located in the first task but not in the second task.

6. The method of claim 1, wherein the priority criterion includes at least one of: keeping a predetermined number of people working on a task, performing a task having a predetermined visibility level to a predetermined audience, completing the set of tasks within a predetermined cost, and completing the maximum number of tasks in the task network.

7. The method of claim 6, wherein the priority criterion includes a plurality of criteria including keeping at least the predetermined number of people working during a predetermined time period while maintaining costs within a predetermined range.

8. The method of claim 6, wherein the priority criterion includes a plurality of criteria including performing a maximum possible number of tasks during a predetermined time period while maintaining costs within a predetermined range.

9. The method of claim 1, further comprising:
generating, by the processor, a plan for allocating resources based on the optimal set of tasks.

10. The method of claim 1, further comprising:
obtaining, by a processor, a representation of a second process;
dividing the second process into tasks; and
determining, by the processor, relationships between the tasks of the first process and the second process,
wherein the task network is generated to include the tasks of the first and second processes, and the task network represents the relationships between the tasks of the first and second processes, and
wherein generating the optimal set of tasks includes analyzing the tasks of the first process and the second process based on the priority criterion.

11. A computer program product, comprising:
memory configured to store computer instructions; and
a processor configured to execute the computer instructions to perform a method, the method comprising:
obtaining, by the processor, a representation of a first process and a second process;
dividing the first process and the second process into tasks that make up the first process and the second process;
determining, by the processor, relationships between the tasks;
generating, by the processor, a task network comprising the tasks of the first and second processes, the task network representing the relationships between the tasks of the first and second processes;
receiving, by the processor, a priority criterion defining an objective; and
generating, based on the priority criterion, an optimal set of tasks in the task network to be performed.

12. The computer program product of claim 11, wherein
generating the task network includes identifying characteristics of the tasks, and
generating the optimal set of tasks includes determining that the optimal set of tasks includes characteristics most likely to meet the objective defined by the priority criterion.

13. The computer program product of claim 11, wherein determining the relationships between the tasks includes determining a similarity between characteristics of the tasks, the characteristics including at least one of a resource needed to perform the task and an output of the task.

14. A method for planning in a context of proposed and ongoing projects, the method comprising:
dividing each of the proposed and ongoing projects into tasks;
identifying, by a project optimization computer, tasks that are at least one of: similar to each other, identical to each other, and have one or more dependent relationships among the tasks;
representing, by a display device controlled by the project optimization computer, the proposed and ongoing projects collectively as a graphical network of the tasks, such that common tasks among the proposed and ongoing projects are represented as sharing nodes in the graphical network of tasks;
receiving, by the project optimization computer, from a user, one or more goals corresponding to objectives; and
selecting, by the project optimization computer, an optimal path in the graphical network corresponding to at least one of the specified goals.

15. The method of claim 14, wherein the optimal path includes a path resulting in a completed project.

* * * * *